United States Patent [19]

Moulin et al.

[11] 4,414,753

[45] Nov. 15, 1983

[54] PROCESS FOR COMPENSATING THE MAGNETIC DISTURBANCES IN THE DETERMINATION OF A MAGNETIC HEADING, AND DEVICES FOR CARRYING OUT THIS PROCESS

[75] Inventors: Michel Moulin; Jean-Claude Goudon, both of Valence; Jean-Marie Marsy, Bourg-les-Valence; Bernard Legendarme, Valence; René Presset, Portes-les-Valence; Louis Dedreuil-Monnet, Valence, all of France

[73] Assignee: Crouzet, Paris, France

[21] Appl. No.: 270,356

[22] Filed: Jun. 4, 1981

[30] Foreign Application Priority Data

Jun. 5, 1980 [FR] France .............................. 80 12725

[51] Int. Cl.³ .............................................. G01C 17/38
[52] U.S. Cl. ......................................... 33/356; 33/357
[58] Field of Search ................... 33/356, 357, 358, 359

[56] References Cited

U.S. PATENT DOCUMENTS

| | | | |
|---|---|---|---|
| 3,621,584 | 11/1971 | Burt | 33/357 |
| 3,696,518 | 10/1972 | Leat | 33/357 |
| 3,943,763 | 3/1976 | Garner | 33/356 |
| 4,006,631 | 2/1977 | Garner | 33/356 |
| 4,031,630 | 6/1977 | Fowler | 33/356 |
| 4,091,543 | 5/1978 | Lapeyre | 33/356 |
| 4,179,741 | 12/1979 | Rossani | 33/356 |

Primary Examiner—Willis Little
Attorney, Agent, or Firm—Holman & Stern

[57] ABSTRACT

The present invention relates to a process for compensating the magnetic disturbances influencing the measurements of a device for determining the magnetic heading, mounted on a land vehicle or aircraft, comprising a magnetometer furnishing analog voltages proportional to the components of the disturbed magnetic field of the earth along its reference axes. It is admitted that the locus of the end of the vector indicative of the field is an ellipse for a land vehicle and an ellipsoid for an aircraft, of which identification from the analog voltages and transformation into a circle or sphere centered at O, origin of the axes of the magnetometer, enable correction coefficients to be calculated which are introduced into the memory of a computer unit associated with the magnetometer in order to define at any instant a vector making with a reference axis of the magnetometer an angle corresponding to the real magnetic heading of the vehicle or of the aircraft.

15 Claims, 11 Drawing Figures

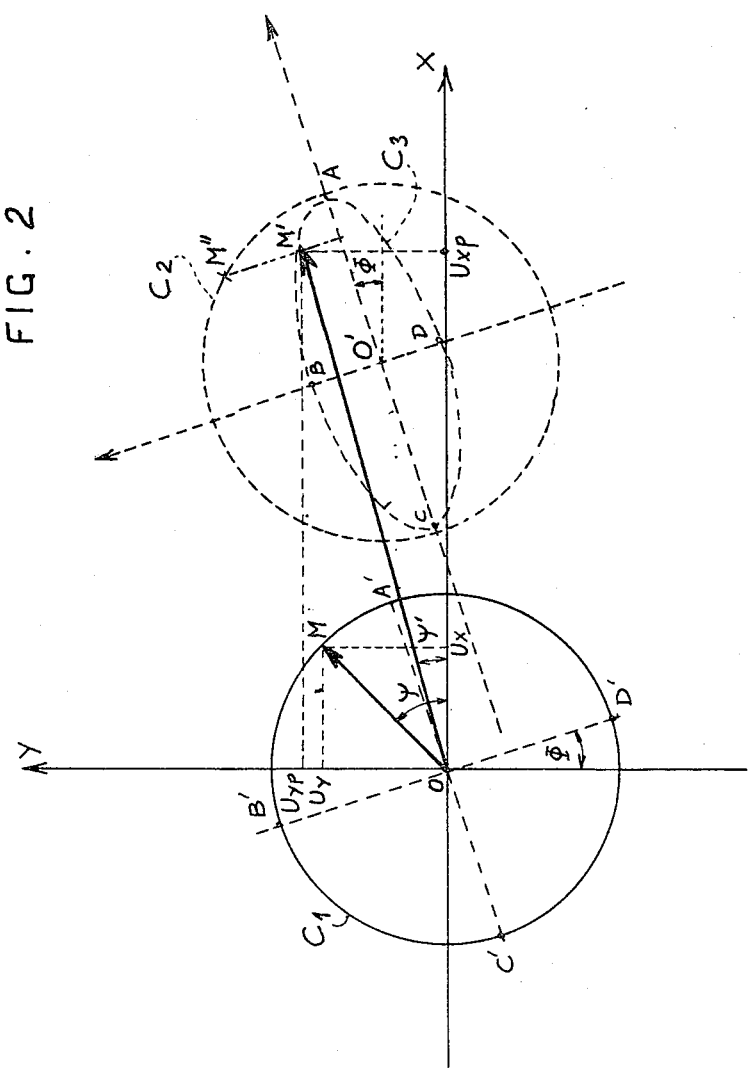

PROCESS FOR COMPENSATING THE MAGNETIC DISTURBANCES IN THE DETERMINATION OF A MAGNETIC HEADING, AND DEVICES FOR CARRYING OUT THIS PROCESS

The invention relates to a process and devices adapted to give, at any instant, the course or heading of a vehicle, in the course of its displacement, with respect to magnetic north. The vehicle in question may for example be a land vehicle or an aircraft.

In known devices of this type, it is known to use, as sensor, a magnetometer sensitive to the variations of the earth's magnetic field, consecutive to the displacement of the vehicle on which this sensor is fixed. In practice, the orthogonal axes OX and OY of the magnetometer are arranged to be merged with the longitudinal axis of the vehicle and an axis which is perpendicular thereto, respectively, both located in a plane P of the vehicle (FIG. 1) which may be horizontal or substantially horizontal, if the vehicle is a land vehicle.

Under these conditions, the magnetometer makes it possible to elaborate voltages proportional to the horizontal components $\vec{Hx}$ and $\vec{Hy}$ of the earth's magnetic field $\vec{H}$. In theory, when the vehicle moves in the magnetic field $\vec{H}$, the projection on a horizontal plane of the vector $\vec{H}$ is a vector $\vec{Hh}$ of which the end M moves over a circle of centre O, origin of the axes OX and OY of the magnetometer. Under these conditions, the real magnetic heading $\psi$, angle formed between the direction of the vehicle and the magnetic north, and the angle $\psi'$, deduced from the coordinates given by the magnetometer of point M with respect to its reference axes, are equal.

In fact, for a given magnetic configuration of the carrier vehicle, the point M, during a rotation of 360° of the vehicle on itself, does not describe a circle, but an ellipse. This observation explains the shift, which is more or less pronounced and variable between the angles $\psi$ and $\psi'$ in the course of the movements of the vehicle in the earth's magnetic field. These heading errors are due to the disturbances of the earth's magnetic field in amplitude and direction, resulting from the proximity of ferromagnetic structures of the vehicle and the magnetic fields induced by the electric currents capable of circulating in the vehicle.

To correct the heading data disturbed in this way, given by the magnetometer, a known method consists in comparing, for a series of well defined cardinal points, the e magnetic compensations of its heading determining device. For an aircraft, the procedure is similar, with a transfer rate gyro.

This method of determining the corrections may require several hours for a team of specialists.

The process and device for compensation according to the invention aim at considerably simplifying the determination of the correction coefficients and at saving an appreciable amount of time. Moreover, the invention aims at furnishing coefficients which, after calculation, give the real magnetic heading $\psi$ with a better precision than the conventional procedure.

To this end, the present invention relates to a process for compensating the magnetic disturbances influencing the measurements of a device determining a magnetic heading on board a vehicle comprising a magnetometer, furnishing analog voltages proportional to the components of the disturbed magnetic field of the earth along its reference axes, in which so-called compensation coefficients are introduced into the memory of a computer module associated with the magnetometer, which makes it possible to correct the information delivered by the magnetometer to obtain the real heading, wherein the compensation coefficients are determined directly and without any heading reference from the disturbed magnetometric voltages furnished by the magnetometer.

With a land vehicle, it is oriented without great precision, in any eight headings, not referenced, substantially equally distributed over 360°. For each position, the disturbed voltages Uxp and Uyp furnished by the magnetometer (FIG. 2) represent the coordinates Xp and Yp in the horizontal plane of the end M' of the disturbed earth's magnetic field vector. It is admitted that these eight points are on an ellipse described by point M' in the course of complete rotation of the vehicle on itself. A computer determines the parameters of this ellipse and elaborates compensation coefficients allowing this ellipse to be transformed into a theoretical circle centred on axes OX and OY of the magnetometer and corresponding to the locus of point M if the disturbances did not exist.

This computer, which may or may not be fast with the heading determining device, therefore defines the parameters of the ellipse and calculates the corrector coefficients which it is necessary to apply to the voltages Uxp, Uyp furnished by the magnetometer to pass from the disturbed magnetic heading $\psi'$ to the real magnetic heading $\psi$. When the land vehicle is not horizontal, the vertical component $\vec{Hv}$ of the earth's magnetic field influences the horizontal components $\vec{Hx}$ and $\vec{Hy}$, of the sole horizontal component $\vec{Hh}$ of the earth's magnetic field, according to the values of the angles of roll $\phi$ and of pitch $\theta$.

These latter corrections are made at the level of the heading determining device which comprises sensors, a compensation module and a display means. The compensation coefficients elaborated by the calculator are introduced in a memory of the compensation module of the heading determining device, in the course of the compensation procedure.

The role of this module consists, from the voltages Uxp=kHxp and Uyp=kHyp furnished by the magnetometer, and from those furnished by an inclinometer, in elaborating electric signals in the form of analog voltages, corresponding to the sine and cosine of the compensated heading, i.e. the real heading $\psi$. These signals are directed towards a display module constituted by a rotating graduated card and a fixed index making it possible to display the real heading $\psi$ of the vehicle with respect to magnetic north.

In the plane P of FIG. 1 are located the two axes OX and OY of the magnetometer, axis OZ representing the vertical if the plane P is assumed to be horizontal. Under these conditions, the magnetic field $\vec{H}$, which is known to be inclined with respect to the horizontal by an angle varying depending on the geographical location, may be intersected along axes OX, OY, OZ in three vectors: $-\vec{Hv}$, vertical component, $-\vec{Hhx}$ and Hhy, components of $\vec{Hh}$, projection of $\vec{H}$ in plane P.

If there were no disturbances of the earth's magnetic field $\vec{H}$ in the vicinity of the vehicle, the angle XOM would represent the real magnetic heading $\psi$. In fact, the field $\vec{H}$ being disturbed, the magnetometer measures the field Hp of which the component $\vec{Hhp}$ in the plane P determines a point M' such that: XÔM is an angle $\psi'$ corresponding to a false magnetic heading. The magnetometer then delivers the two disturbed analog voltages Uxp=kHxp and Uyp=kHyp, k being a coefficient corresponding to the scale factor of the magnetometer.

In the case of an aircraft, the compensation is effected:

by assuming that the module of the earth's field is constant between two successive measurements;

by examining the evolution of the module of the disturbed magnetic field of the earth in space (ellipsoid), by calculating, in iterative manner, the coefficient of compensation enabling the evolution of the module of the earth's magnetic field to be returned from an ellipsoid to a theoretical sphere centred on the axes of the magnetometer, in order to define the correspondence between the disturbed measurements and the real measurements.

If the ferromagnetism of a land vehicle had no incidence on the earth's magnetic field, the end M of the horizontal component $\vec{Hh}$ of this magnetic field would describe a circle $C_1$ of centre O origin of the axes OX and OY of the magnetometer (FIG. 2).

In fact, there are so-called "hard iron" disturbances due to the permanent fields associated with the ferromagnetic structures of the vehicle which are magnetized in the course of manufacture or under the influence of magnetic fields of electrical origin. These permanent fields are connected to the vehicle and rotate therewith.

This results in that the magnetometer measures the components of a vector of which the end M″ moves over a circle $C_2$ whose centre O′ is offset by (Xo, Yo) with respect to the origin of the axes of the magnetometer.

In space, and in a reference mark connected to the magnetometer, these permanent fields may be represented by a vector:

$$\vec{Ho} = Xo\vec{i} + Yo\vec{j} + Zo\vec{v}$$

$\vec{i}$, $\vec{j}$ and $\vec{v}$ representing the marked orthogonal axes of the three-axis magnetometer mounted on the land vehicle. If the vehicle moves on a plane close to the horizontal, a two-axis magnetometer may suffice.

There is a second type of disturbance, called "soft iron" disturbance, affecting the measurements of the magnetometer, and which are due to the fields induced by the action of the earth's magnetic field. These fields do not rotate with the vehicle, but their polarities and their amplitudes vary as a function of the direction and the amplitude of the earth's magnetic field with respect to the vehicle.

The representation of these induced fields $\vec{Hi}$ may be written in the following form:

$$Hi = (kxxHx + kxyHy + kxzHz)$$
$$i + (kyxHz + kyyHy + kyzHz)$$
$$j + (kzxHx + kzyHy + kzxHz) v$$

or, in matricial form:

$$Hi = K.R.H$$

R being the matrix of passage of the geographical reference (north, east, vertical) in the reference of the magnetometer.

All magnetic disturbances included, the magnetometer measures a disturbed field Hp, such that:

$$Hp = Ho + K.R.H. \quad (1)$$

For the application of the search for the heading of a land vehicle, it is sufficient to solve the equation (1) in the plane of the two-axis magnetometer, or:

$$H = R^{-1}K^{-1}(Hp - Ho).$$

For angles $\theta$ and $\phi$ of small amplitudes, the horizontal components of the compensated field may be written:

$$\begin{cases} Hh'x = lxx(Hxp - Hxo) + lxy(Hyp - Hyo) - \theta Hv \\ Hh'y = lyx(Hxp - Hxo) + lyy(Hyp - Hyo) + \phi Hv \end{cases}$$

$$\begin{bmatrix} lxx & lxy \\ lyx & lyy \end{bmatrix}$$

being the "soft iron" compensation matrix,

Hxo and Hyo the components of the field due to the "hard iron" disturbances, and Hv the vertical component of the earth's magnetic field.

The compensated, or real, magnetic heading is obtained by the equation:

$$\psi = \arctan \frac{Hh'y}{Hh'x}$$

The parameters Hxo, Hyo, lxx, lxy, lyx and lyy are determined by the following process.

The expression of the disturbed magnetic field Hp measured by a two-axis magnetometer along its axes OX and OY may be written:

$$Hpx = Hxo + kxxHx + kxyHy + kxzHz \quad (2)$$

$$Hpy = Hyo + kyxHx + kyyHy + kyzHz$$

When the vehicle is horizontal at the moment of the compensation procedure, Hz=Hv, vertical component, which is constant for a given locus.

Hx=Hh cos $\psi$ and Hy=Hh sin $\psi$ (Hh being the horizontal component of the earth's magnetic field $\vec{H}$).

Hxo and Hyo are two constant fields due to the "hard iron".

When the point M″ describes the circle $C_2$ on the horizontal plane, the point M′ describes an ellipse $C_3$ of centre:

$$Xo = (Hxo + kxzHz)$$

$$Yo = (Hyo + kyzHz)$$

The lengths of the axes of this ellipse depend on kxx, kyy and have an inclination $\Phi$ with respect to the reference axes which depend on kxy and kyx.

The magnetometer is constituted in known manner by two orthogonal probes of which the axes are advantageously merged with the axes of the carrier vehicle, or parallel thereto.

Under these conditions, the magnetometer delivers analog information in the form of two disturbed voltages Uxp and Uyp such that:

$$Uxp = Uxo + kxzUz + kxxUx + kxyUy \quad (3)$$

-continued
$$Uyp = Uyo + kyzUz + kyxUx + kyyUy$$

| Constant term | Variable term |
|---|---|
| hard iron | soft-iron |

$\psi$ being the magnetic heading angle read on the heading determining device, after correction, Ux non-disturbed voltage = Uh cos $\psi$ with Uh = kHh
Uy non-disturbed voltage = Uh sin $\psi$ with Uh = kHh
Uz = Uo constant voltage corresponding to the vertical component kHv.

The method of compensation consists, from a few measurements relative to different orientations of the vehicle on a horizontal plane and distributed over 360°, in calculating the coefficients:

$$Xo = Uxo + kxzUz$$

$$Yo = Uyo + kyzUz$$

$$lxx, lxy, lyx, lyy,$$

such that $$Ux = Uxplxx + Uyplxy - (Xo + X_T + Xv) - \theta U. \quad (4)$$

$$Uy = Uyplyy + Uxplyx - (Yo + Y_T + Yv) + \phi U.$$

represent the corrected voltages necessary for obtaining the real heading $\psi$, $X_T$ and $Y_T$ being correction factors corresponding to displacements of magnetic masses and Xv and Yv being correction factors corresponding to the temporary presence of electric currents on board the vehicle.

To determine these coefficients, it is necessary to:

(1) Determine the ellipse $C_3$

To this end, it is admitted that the voltages Uxp, Uyp furnished by the magnetometer for each of the orientations of the vehicle correspond to the coordinates, along axes OX, OY, of the various points M' of the ellipse, or: $M'_1$ (Ux$_1$p, Uy$_1$p), $M'_2$ Ux$_2$p, Uy$_2$p) ... M'n (Uxnp, Uynp).

In practice, five to eight points suffice to define this ellipse.

(2) Transform the ellipse $C_3$ into a circle $C_1$

The transformations to which these voltages must be subjected for this ellipse $C_3$ to be transformed into a concentric circle $C_1$ with axes OX and OY, are elaborated by means of a computer or by a graphic process. One passes from point M' on the ellipse $C_3$ to corresponding point M on this circle $C_1$ by a translation of the vector $\overrightarrow{O'O}$ (O' being the centre of the ellipse) and by a double affinity of ratio R/a along axis OX and R/b along axis OY, R being the radius of the circle $C_1$ and a and b the semi-axes of the ellipse $C_3$. The radius R may be chosen arbitrarily without modifying the angles.

These two transformations correspond to the compensation of the "hard iron" and "soft iron" effects.

(3) Determine the correspondence between a point of the ellipse $C_3$ and its corresponding point on the circle $C_1$ There is affected to any point M' of the ellipse $C_3$ its corresponding point M on the theoretical circle $C_1$, such that the angle $\widehat{OX,OM}$ represents the non-disturbed magnetic heading $\psi$ of the vehicle, deduced from the measured angle $\widehat{OX,OM'}$ corresponding to the heading $\psi'$ falsified by the disturbances.

The correspondence between a point of the ellipse and a point of the circle is finally made by the choice of a rotation of the points of the circle $C_1$ about its centre O.

The method uses the following choice: after the translation $\overrightarrow{O'O}$ and the double affinity, the rotation is reduced to an identity, i.e. to a rotation of zero angle. This means that the soft iron disturbance coefficients constitute a symmetrical matrix, and that 1xy = 1yx. Consequently, the transformed points of A.B.C.D. are the points A',B',C',D' as indicated in FIG. 2, with O'A, O'B, O'C and O'D respectively parallel to OA', OB', OC' and OD'.

Measurements are made, for example in five orientations of the vehicle in horizontal position and regularly spaced over a revolution.

The measurements of the magnetometer are thus plotted $$(Ux_1, Uy_1), (Ux_2, Uy_2) \ldots (Ux_5, Uy_5)$$

The equation of the ellipse in the reference XOY of the magnetometer is written:

$$\alpha Ux^2 + \beta Uy^2 + \gamma Ux.Uy + \delta Ux + \epsilon Uy = 1$$

The parameters $(\alpha, \beta, \gamma, \delta, \epsilon) = V$ defining the ellipse, verify the following equation: $W \cdot V = Z$ with $$Z = \begin{pmatrix} 1 \\ 1 \\ 1 \\ 1 \\ 1 \end{pmatrix}$$

and $$W = \begin{pmatrix} Ux_1^2, & Uy_1^2, & Ux_1 \cdot Uy_1, & Ux_1, & Uy_1 \\ Ux_2^2, & Uy_2^2, & Ux_2 \cdot Uy_2, & Ux_2, & Uy_2 \\ \cdot & \cdot & \cdot & \cdot & \cdot \\ \cdot & \cdot & \cdot & \cdot & \cdot \\ Ux_5^2, & Uy_5^2, & Ux_5 \cdot Uy_5, & Ux_5, & Uy_5 \end{pmatrix}$$

The computer reverses the matrix W and effects the product:

$$V = W^{-1} \cdot Z$$

In practice, the measurements are advantageously used along eight orientations, and the parameters V are elaborated by applying a conventional, so-called method of least squares, to eliminate part of the noise of measurement.

The parameters a, b, $\Phi$, Xo, Yo of the ellipse are then calculated, as shown in FIG. 2.

These parameters are the following:
a = semi-large axis of the ellipse $C_3$
b = semi-small axis of the ellipse $C_3$
$\Phi$ = angle of inclination of the axes of the ellipse with respect to the axes of the magnetometer, $\left. \begin{array}{c} Xo \\ Yo \end{array} \right\}$ coordinates of the centre of the ellipse $C_3$.

$$Xo = \frac{\gamma\epsilon - 2\beta\delta}{4\alpha\beta - \gamma^2}$$

$$Y_o = \frac{\gamma\epsilon - 2\alpha\epsilon}{4\alpha\beta - \gamma^2}$$

$$t_g = \frac{\beta - \alpha + k\sqrt{(\alpha-\beta)^2 + \gamma^2}}{\gamma}$$

$$a = \sqrt{\frac{2}{\alpha + \beta + \frac{\gamma}{\sin 2\Phi}}}, \text{ with } \begin{cases} k = 1 \text{ if } \alpha + \beta > 0 \\ k = -1 \text{ if } \alpha + \beta < 0 \end{cases}$$

$$b = \sqrt{\frac{2}{\alpha + \beta - \frac{\gamma}{\sin 2\Phi}}}$$

Knowing the parameters of the ellipse $C_3$, the corrections for transforming it into a circle $C_1$ are determined. To this end, the translation:

$$Ux - Xo$$

$$Uy - Yo$$

and a double affinity are effected.

To apply the affinity, one places onself in the reference of the ellipse:

$$Uex = \cos\Phi(Ux - Xo) + \sin\Phi(Uy - Yo)$$

$$Uey = \sin\Phi(Ux - Xo) + \cos\Phi(Uy - Yo)$$

Affinity is written:

$$Xe = \frac{R}{a}[\cos\Phi(Ux - Xo) + \sin\Phi(Uy - Yo)]$$

$$Ye = \frac{R}{b}[-\sin\Phi(Ux - Xo) + \cos\Phi(Uy - Yo)]$$

or, returning to the references of the magnetometer, $$X = \cos\Phi\, Xe - \sin\Phi\, Ye$$

$$Y = \sin\Phi\, Xe + \cos\Phi\, Ye$$

or, $$X = (X - Xo)\left(\frac{R}{a}\cos^2\Phi + \frac{R}{b}\sin^2\Phi\right) +$$

$$(y - yo)\left(\frac{R}{a}\sin\Phi\cos\Phi - \frac{R}{b}\sin\Phi\cos\Phi\right)$$

$$Y = (X - Xo)\left(\frac{R}{a}\sin\Phi\cos\Phi - \frac{R}{b}\sin\Phi\cos\Phi + \right.$$

$$\left. (Y - Yo)\left(\frac{R}{a}\sin^2\Phi + \frac{R}{b}\cos^2\Phi\right) \right.$$

The final treatment, to obtain the compensation parameters, is therefore as follows:

Compensation of hard irons $\begin{cases} -Xo \\ -Yo \end{cases}$

Compensation of soft irons $\begin{cases} Rxx = \frac{R}{a}\cos^2\Phi + \frac{R}{b}\sin^2\Phi \\ Ryx = Rxy = \left(\frac{R}{a} - \frac{R}{b}\right)\sin\Phi\cos\Phi \\ Ryy = \frac{R}{a}\sin^2\Phi + \frac{R}{b}\cos^2\Phi \end{cases}$ with R: radius of circle $C_1$, arbitrary value, and $Ryx = Rxy$ since the matrix is symmetrical.

We shall now examine the case of an aircraft.

If the ferromagnetism of the aircraft had no influence on the earth's magnetic field, the end M of the vector representing the magnetic field would describe a sphere (FIG. 3) of centre O, origin of axis OX, OY, OZ of the magnetometer, admitting that the aircraft may take all possible attitudes. In fact, the magnetometer measures the components of a vector of which the end M'' moves in a sphere $S_z$ whose centre O', due to the permanent hard iron fields, is translated from $B_1$, $B_2$, $B_3$ with respect to the origin of the axes of the magnetometer.

In space and in a reference connected to the magnetometer, these permanent fields may be represented by a vector:

$$\vec{B} = B_1\vec{i} + B_2\vec{j} + B_3\vec{k}$$

$\vec{i}, \vec{j}, \vec{k}$ representing the marked orthogonal axes of the three-axis magnetometer mounted on the aircraft.

The representation of the induced soft iron field $\vec{H_i}$ may be written as follows:

$$\vec{H_i} = (k_{11}H_{t1} + k_{12}H_{t2} + k_{13}H_{t3})\vec{i} + (k_{21}H_{t1} + k_{22}H_{t2} + k_{23}H_{t3})\vec{j} + (k_{31}H_{t1} + k_{32}H_{t2} + k_{33}H_{t3})\vec{k}$$

or in matrical form $\vec{H_i}: K\vec{H}_{ta}$, $H_{ta}$ being the earth's field in aircraft centrelines.

All disturbances included, the magnetometer measures a disturbed field $\vec{H_m}$ such that:

$$\vec{H}_{ma} = \vec{H}_{ta} + \vec{B} + K.\vec{H}_{ta} = \vec{B} + (I+K)\vec{H}_{ta}$$

To have the heading, it suffices to calculate
$$\vec{H}_{ta} = (I+K)^{-1}(\vec{H}_{ma} - \vec{B})$$

and then to calculate the horizontal components of the compensated earth's field due to a vertical reference.

The equations which enable the magnetic heading to be calculated from a vertical reference and the measurements of the earth's magnetic field in an aircraft will be recalled, viz.

[A], of axes (X,Y,Z), the aircraft reference, and

[Gm], of axes (Nm, Em, V), the local geomagnetic reference.

At any instant t, the passage of [A] on [Gm] is defined by the successive rotations $(-\phi, -\theta, -Cm)$, FIG. 4, with
$\phi$: angle of roll
$\theta$: pitch attitude
Cm: magnetic heading.

The magnetic field vector of the earth is defined by $Ht = (H_{t1} + H_{t2} + H_{t3})$ dans [A]
$Ht = (Hn, O, Hv)$ dans [Gm].

The parameters in reference [Gm] are deduced from the module $$\begin{cases} H_n = H_t \cos \alpha \\ H_v = H_t \sin \alpha \end{cases} \quad \begin{array}{l} H_t\text{: module of the field vector} \\ \alpha\text{: inclination of the field with} \\ \phantom{\alpha\text{: }}\text{respect to the horizontal plane} \end{array}$$

The following relationships are then found:

$$H_n = H_t \cos \alpha = (\cos \theta \cos C_m) H_{t1} + (\cos C_m \sin \theta \sin \phi - \sin C_m \cos \phi) H_{t2} + (\cos C_m \sin \theta \cos \phi + \sin C_m \sin \phi) H_{t3} \quad (11)$$

$$0 = \sin C_m \cos \theta H_{t1} + (\sin C_m \sin \theta \sin \phi + \cos C_m \cos \phi) H_{t2} + (\sin C_m \sin \theta \cos \phi - \cos C_m \sin \phi) H_{t3} \quad (12)$$

$$H_v = H_t \sin \alpha = -\sin \theta H_{t1} + \sin \phi \cos \theta H_{t2} + \cos \phi \cos \theta H_{t3} \quad (13)$$

From the second equation, the magnetic heading $C_m$ may be calculated $$C_m = \text{Arc tan} \left( \frac{H_{t3} \sin\phi - H_{t2} \cos\phi}{H_{t1} \cos\theta + H_{t2} \sin\theta\sin\phi + H_{t3} \sin\theta\cos\phi} \right) + k\pi$$

The ambiguity of 180° due to the arc tangential function is removed on examining the sign of $\cos C_m$ (obtained from equations (11) and (12));

$$\cos C_m = \frac{H_{t1} \cos\theta + H_{t2} \sin\theta\sin\phi + H_{t3} \sin\theta\cos\phi}{H_t \cos\alpha}$$

$\alpha$, by definition being included between $$-\frac{\pi}{2} \text{ and } +\frac{\pi}{2}$$

therefore $H_t \cos \alpha > 0$

The expression of $\cos C_m$ is then of the sign of its numerator which is the denominator of the expression $\tan C_m$, the sequence of removing doubt on $C_m$ therefore not necessitating any additional algebraic calculation.

To calculate the hard iron and soft iron compensation, only the measurements delivered by the magnetometer are used.

For a vector, only the information from its module is independent of the measuring trihedron. The module of the magnetic field vector of the earth therefore does not depend on the measurement trihedron and by hypothesis has a sufficiently weak gradient to be ignored. The variation in time may be considered as null.

These remarks are formulated by the equation:

$$\frac{d\vec{H_t}}{dt} = \vec{0} \text{ for any } t$$

$$\overline{H_t} = \sqrt{H_{t1}^2 + H_{t2}^2 H_{t3}^2}$$

$H_{t1}$, $H_{t2}$, $H_{t3}$ being the components of the magnetic field in aircraft centrelines, and $H_t$ the module of the earth's magnetic field.

The modelisation of the hard iron and soft iron disturbances (the vector measured moves over an ellipsoid) therefore leads to the following expression of the measured components:

$$H_{mi} = H_{ti} + B_i + \sum_{j=1}^{3} k_{ij} H_{tj}$$

The equation of the module of the measured field is then written, keeping only the terms of the first order (as it is assumed that the disturbances are infinitesimals of the first order, with respect to the components measured), $$\overline{H_m^2} = \overline{H_t^2} + 2 \sum_{i=1}^{3} B_i H_{ti} + 2 \sum_{i=1}^{3} H_{ti} \sum_{j=1}^{3} k_{ij} H_{tj} + \epsilon$$

with $\epsilon$, sum of the infinitesimals of the 2nd and 3rd order.

If this expression is derived with respect to time t, the following is obtained:

$$\frac{d\overline{H_m^2}}{dt} = \frac{d\overline{H_t^2}}{dt} + 2 \sum_{i=1}^{3} B_i \frac{dH_{ti}}{dt} + \sum_{i=1}^{3} \sum_{j=1}^{3} (k_{ij} + k_{ji}) \frac{d(H_{ti} + H_{tj})}{dt}$$

$H_t$ being a constant, the following is obtained:

$$\frac{d\overline{H_m^2}}{dt} = 2 \sum_{i=1}^{3} B_i \frac{dH_{ti}}{dt} \sum_{i=1}^{3} \sum_{j=1}^{3} (k_{ij} + k_{ji}) \frac{d(H_{ti} + H_{tj})}{dt}$$

The equation is linear and shows nine parameters. It enables only the symmetrical part of the soft irons to be estimated ($k_{ij} + k_{ji}$). Moreover, the coefficients of the parameters are the derivatives of the components of the earth's field which can only be approximated by the estimated components of the earth's field. The nine parameters are estimated by the conventional method of recursive least squares.

At each sampling instant, the information from the magnetometer is taken and these new measurements are taken into account to improve the estimation of the parameters.

At instant n, therefore, $$d(\vec{H_m^2}) = \vec{H_{mn}}^2 - \vec{H_{mn-1}}^2$$

and $$\vec{H_{tn}} = [I + K_{n-1}]^{-1} (\vec{H_{mn}} - \vec{B_{n-1}})$$

solving:

$$d\overline{H_m^2} = 2 \sum_{i=1}^{3} B_i d\vec{H_{tei}} + \Sigma \Sigma (k_{ij} + k_{ji}) \frac{\alpha(\vec{H_{tei}} \cdot \vec{H_{tej}})}{dt}$$

with $\vec{H_{te}}$: estimated earth's field.

The measurements have shown that the terms of the tensor [K] were very weak if the magnetometer were well harmonised and placed fairly far from the considerable disturbances of the carrier, therefore the following may be written:
$$[I+K]^{-1} = I - K$$

Moreover, the hypothesis that the matrix is symmetrical is verified in practice if the axes of the magnetometers are merged with the axes of the carrier.

FIG. 3 shows the magnetic field vector of which the end M', when the aircraft moves in all directions in space, describes an ellipsoid E. The process of compensation consists, in a first stage, in transforming this ellipsoid into a sphere S' centred on O' and in then centering it on the origin O of the axes OX, OY and OZ of the magnetometer by a translation $\overparen{OO}$.

Under these conditions, $\overrightarrow{OM}$ is the theoretical vector $\overrightarrow{Ht}$ if there was no disturbance. On plane P (OX, OY), it may be stated that:

the angle $\overparen{OX, OH'}$ represents the disturbed magnetic heading $\psi'$, and the angle $\overparen{OX, OH}$ the magnetic heading $\psi$.

FIG. 4 shows the various rotations making it posible to pass from the axes of aircraft centreline X,Y and Z to the axes of the local geomagnetic reference Nm, Em and vertical V.

rotation of Cm, magnetic heading, about Z
rotation of $\theta$, pitch attitude, about Y"
rotation of $\phi$, roll, about X',
the angle $\alpha$ representing them inclination of magnetic field.

The invention will be more readily understood on reading the following description with reference to the accompanying drawings, in which:

FIG. 2 is an illustration of the voltage furnished by the magnetometer of the system of FIG. 5.

Figure 1:
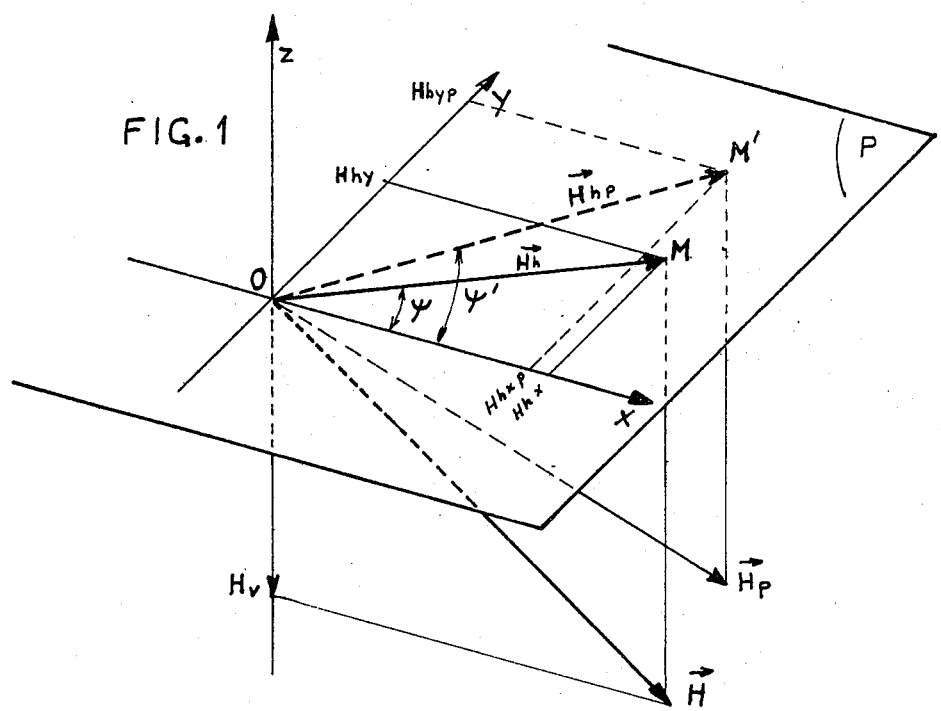
Figure 6:
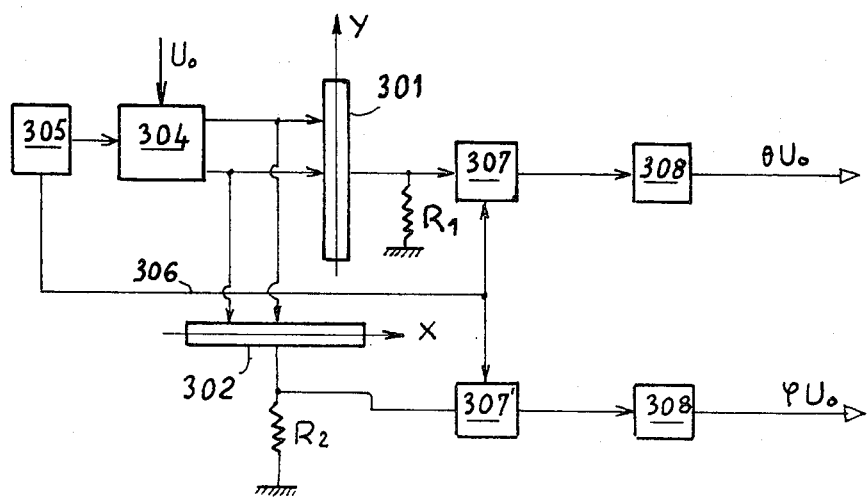
FIG. 6 shows the block diagram of the inclinometer and its associated circuit of the system of FIG. 5.
Figure 3:
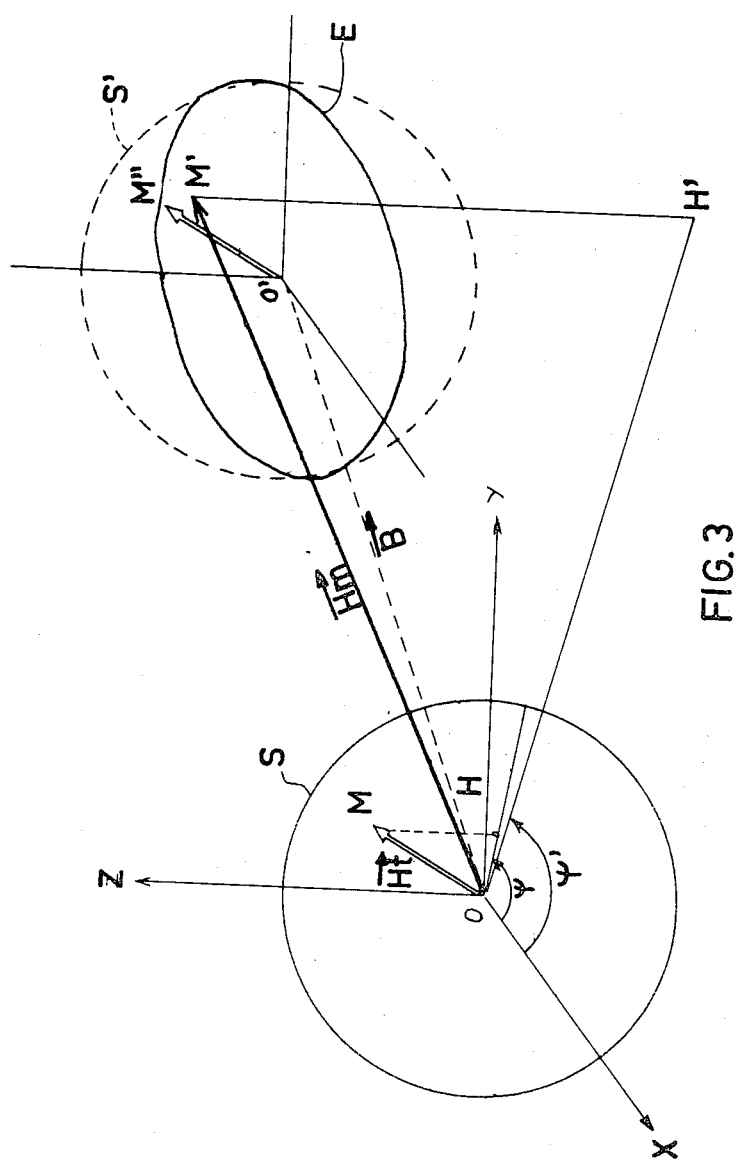
FIG. 3 is an illustration of the voltages furnished by the magnetometer of the system of FIG. 11.
Figure 4:
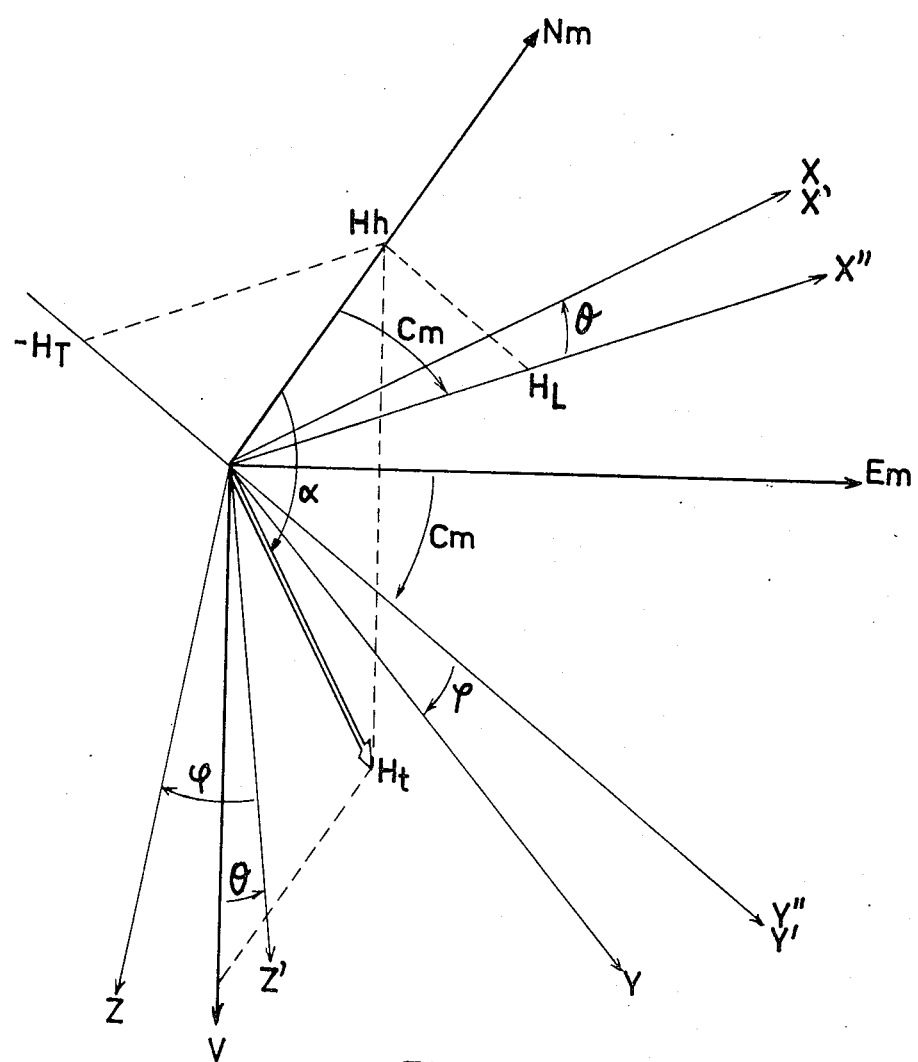
FIG. 4 shows the aircraft centreline and the local geomagnetic reference attached to the system of FIG. 11.
Figure 5:
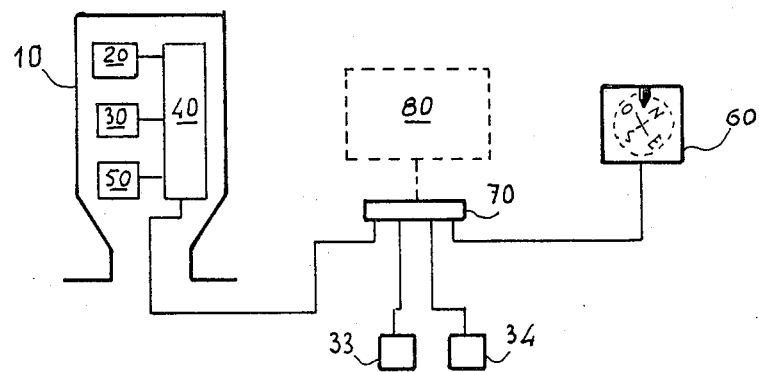
FIG. 5 shows a schematic block diagram of the heading system of a land vehicle.

Referring now to the drawings, the actual heading system of a land vehicle, FIG. 5, comprises a sensor assembly which comprises, inside a body 10, and made of non-magnetic material:

a supply 50 a static magnetometer 20, advantageously reduced to two axes, which delivers the two disturbed analog voltages Uxp and Uyp. This magnetometer is for example of the type described in Applicant's French Pat. No. 73 00084, an inclinometer 30 (FIG. 6) composed of two electrolytic level sensors 301, 302 and which furnishes, from a voltage Uo indicative of the vertical component of the earth's magnetic field, which is a constant for a determined latitude, two voltages $\theta$Uo and $\phi$Uo for compensating the slope of the vehicle.

This inclinometer 30 is associated with an electronic circuit comprising an oscillator 305, for example, of 400 Hz, followed by a shaping stage 304, furnishing two signals in phase opposition to each level sensor 301 and 302, as well as a synchronisation signal via a line 306, to demodulators 307 and 307'. The amplitude of the signals present on resistors $R_1$ and $R_2$, respectively connected upstream of the demodulators 307 and 307', is proportional to the absolute value of the angle of inclination of each sensor and their phase furnishes the sign of the angle of inclination. The synchronous demodulation and active filters 308, connected to the output of the demodulators, make it possible to obtain an output signal directly proportional in amplitude to the angle of inclination of the sensor and of the same sign.

The data from the magnetometer and the inclinometer are introduced into an electronic unit 40, called compensation module, which elaborates the compensated voltages Ux and Uy, from the soft iron correction coefficients 1xx, 1xy, 1yy which were stored in its memory, by a computer 80, at the moment of the compensation procedure.

These voltages are directed, via a junction box 70, towards a display device 60 of the compass card type.

In addition, sensors placed in the vehicle make it possible to actuate switches 33 and 34 to introduce into the module 40 complementary hard iron correction factors, calculated in advance and corresponding to well-defined displacements of magnetic masses ($X_T$, $Y_T$) and/or to the temporary presence of electric current (Xv, Yv) on board the vehicle.

The compensation module 40 functions in two ways, depending on whether the heading system is used on the ground for determining the real heading or whether it serves to acquire the measurements during the compensation procedure.

Figure 8:
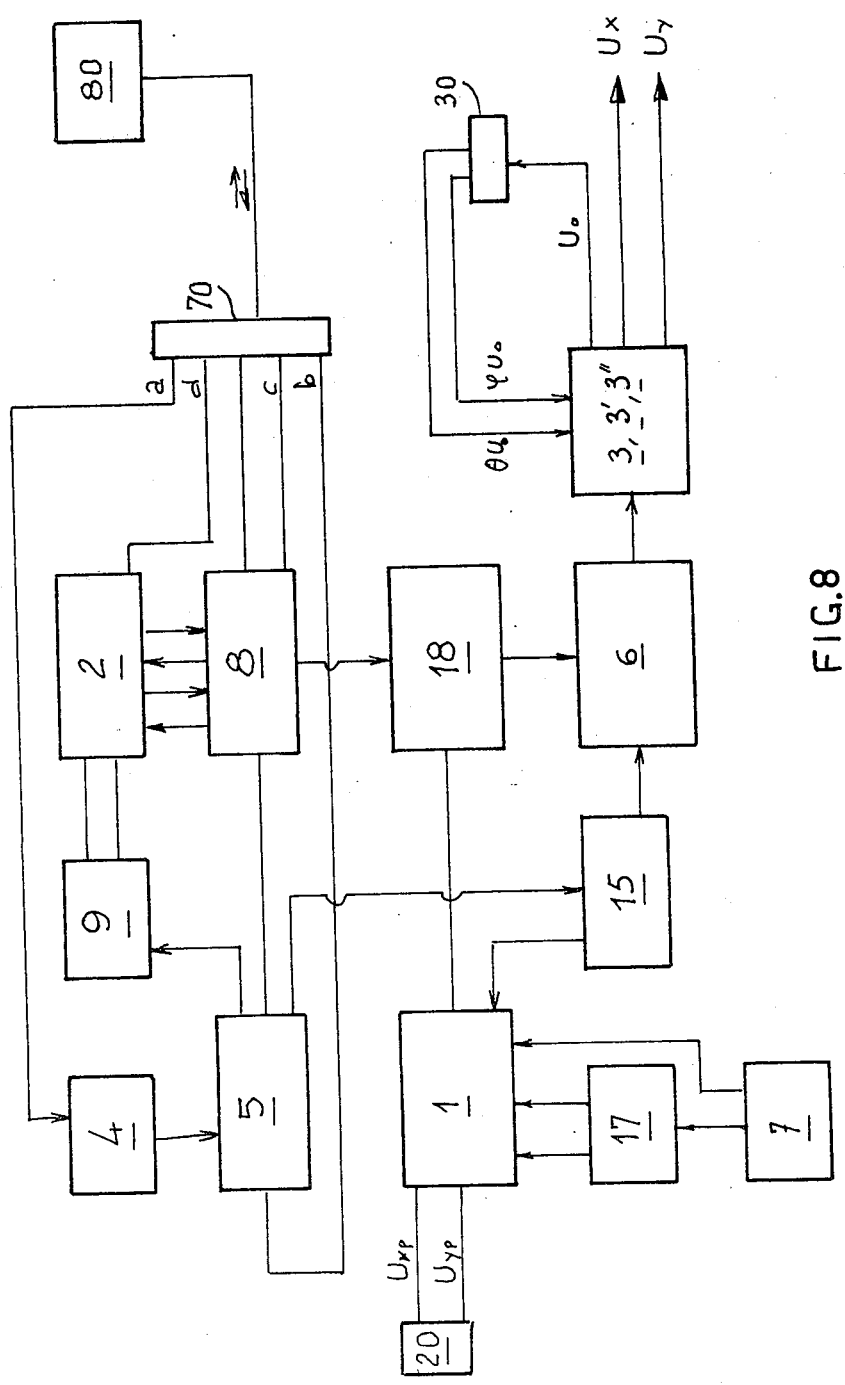
FIG. 8 shows a detailed view of the electronic unit of the system of FIG. 5.

When the vehicle is moving, the compensation module (FIG. 8) elaborates the two compensated voltages:

$$Ux = Uxplxx + Uyplxy - (Xo + X_T + Xv) - \theta Uo \quad (4)$$

$$Uy = Uyplyy + Uxplyx - (Yo + Y_T + Yv) + \phi Uo$$

Uh being the real magnetic heading read, $$Ux = Uh \cos \psi$$

$$Uy = Uh \sin \psi, \text{ where } Uh = kHh$$

During the compensation procedure, the module 40 transmits the measurements of the magnetometer and of the inclinometer to the computer 80 which deduces therefrom the compensation coefficients. At the end of the procedure, the computer 80 introduces these coefficients in a memory 2 of the module 40, which may then effect the corrections on the voltages Uxp and Uyp and take into account the inclination of the vehicle to give the real magnetic heading $\psi$.

An electronic unit 40 (FIG. 8) comprises two sub-assemblies. A first sub-assembly functioning in digital mode for example made in logic C-Mos, comprising a clock 4, a sequence generator 5, and the memory 2 associated with an address counter 9.

This sub-assembly receives the control signals and the information coming from the computer 80 at the moment of compensation. It then serves as data bank due to memory 2, the computer 80 being disconnected.

A second sub-assembly functioning in analog mode (variable voltages) comprising an input multiplexer 1, means delivering a reference voltage 7, a digital-to-analog converter 18, used as multiplier, an output multiplexer 6, and output amplifier-adders 3,3' and 3''.

This sub-assembly receives the data Uxp and Uyp from the magnetometer 20 and the hard iron correction voltages such as Xo and Yo and other complementary voltages $X_T$, $Y_T$ and Xv, Yv, to be taken into account only during modification of the magnetic configuration of the carrier vehicle corresponding to relative displacements of magnetic masses or to the starting up of electric motors.

The heading is calculated as follows:

Under the pulse from clock 4, the sequence generator 5 increments the address counter 9 to read in the memory 2, for example, the first corrector term 1xx of the voltage Ux. At the same time, via a multiplexer control 15, the generator 5 selects the input term Uxp coming from the magnetometer 20 as well as the output channel 1xx of the multiplexer 6. Once the multiplication "Uxp1xx" is effected in the digital-to-analog converter 18, via a register 8, this partial result, in the form of a fugitive analog voltage, is memorised by means of a capacitor connected, on channel (1xxUxp) to the output of the multiplexer 6 (FIG. 7).

The terms of each expression Ux and Uy are thus calculated one by one, and the partial results are each memorised, in analog form, by means of a capacitor provided at the output of the multiplexer 6 on each line of each term of the calculation, namely 1xx, 1xy, Xo, $X_T$ and Xv on the one hand, and 1yy, 1yx, Yo, $Y_T$ and Yv on the other hand.

Figure 7:
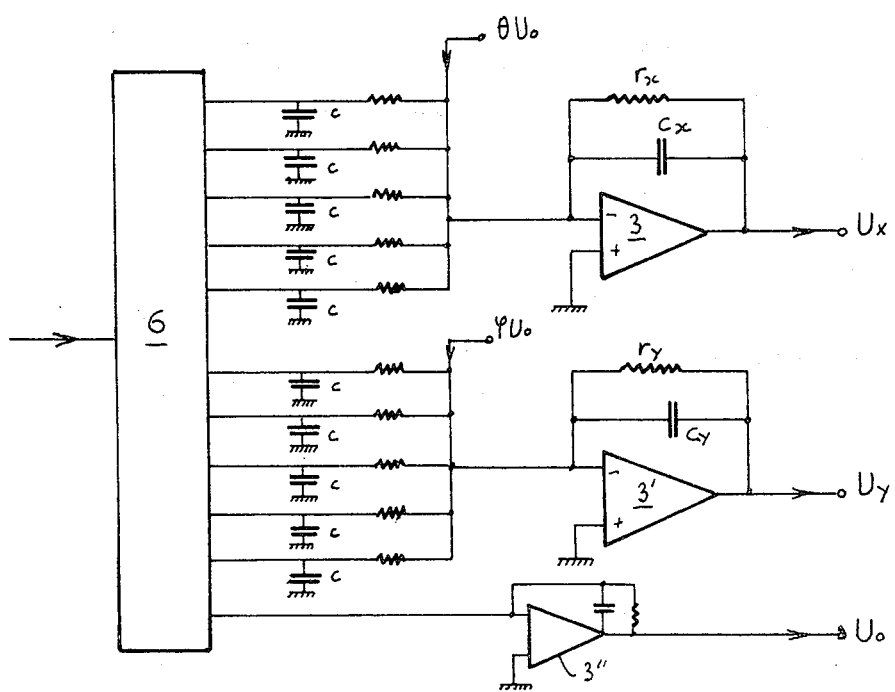
FIG. 7 shows the output circuit of the output multiplexer of the electronic unit of the system of FIG. 5.

Once all the terms are calculated, the sums to obtain Ux and Uy, according to the system of equations (4) are made by the two amplifier-adders 3 and 3', arranged to further perform a function of filtering, due to capacitors Cx, Cy and resistors rx and ry respectively connected between the input and the output of these amplifiers (FIG. 7).

The voltage Uo indicative of the vertical component Hv of the earth's magnetic field is elaborated in the same manner, from the corresponding information, or digital profile, which is stored in the memory 2 and which serves to multiply the reference voltage, Vref furnished at 7, then is applied to the input of the inclinometer 30 (FIG. 8) to obtain the voltages $\theta$Uo and $\phi$Uo which will be introduced into the amplifier-adders 3 and 3' corresponding to the channels Ux and Uy. The hard iron corrections Yo, Xo and complementary corrections $X_T$, $Y_T$ and Xv, Yv are elaborated in the same manner from the reference voltage Vref multiplied by the digital profile of the hard iron parameters memorised in the memory 2 at the moment of compensation.

In the course of compensation, i.e. at the moment of determining the compensation coefficients, the heading system is connected to the computer 80, called compensation computer, which controls its operation. Via the junction box 70, the computer 80 takes into account the data Uxp, Uyp, $\theta$Uo, $\phi$Uo and Uo coming from the heading system. It elaborates the compensation parameters and introduces these parameters in the form of digital signals in the memory 2 of the module 40. Then, it disconnects the clock 4 by a channel (a) (FIG. 8), it returns to zero the address counter 9 of the memory 2 by a channel (b), via the generator 5 it introduces the compensation data in digital form in the register 8 by an input-series channel (c) then it controls the transfer of the contents of this register 8 in the memory 2 to the address selected with the aid of a validation signal on a channel (d), until the recording of all the compensation parameters has been effected in the memory 2. This memory 2 is rendered non-volatile by a safety voltage delivered, for example, by a lithium buffer stack, in order not to lose the data in the case of cut off of supply on the network of the carrier vehicle.

Figure 9:
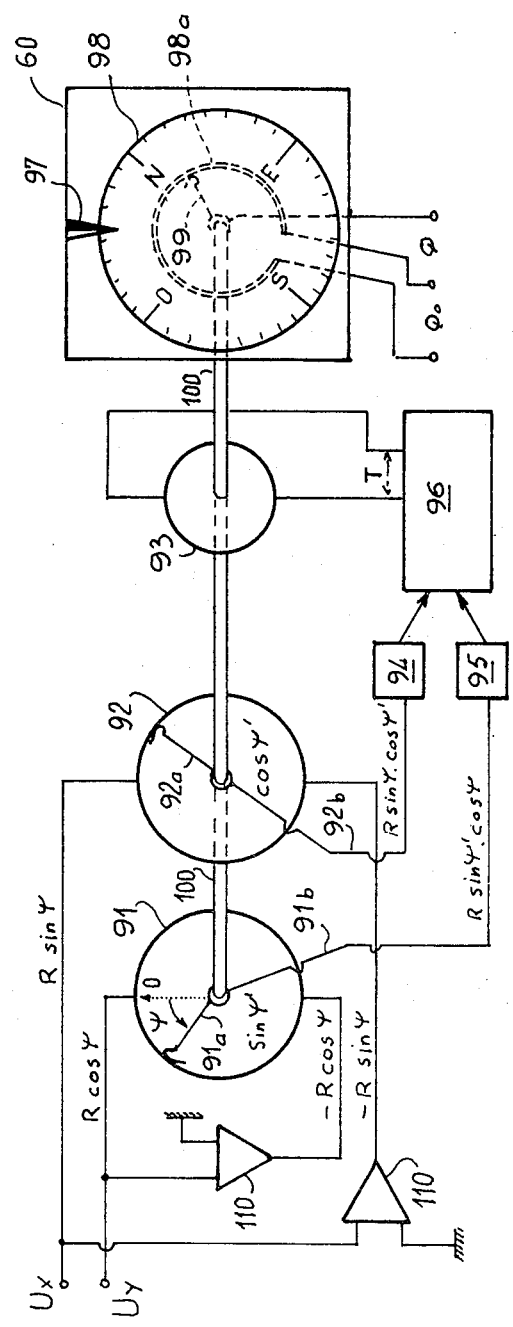
FIG. 9 shows the display circuit of the system of FIG. 5.

The two voltages Ux = R cos $\psi$ and Uy = R sin $\psi$ (cf. hereinabove) elaborated by the compensation module 40 of the heading system, are transmitted to the display means 60 (FIG. 9) having a double role. On the one hand, it makes it possible permanently to represent the magnetic heading followed by the vehicle by means of a compass card rotating in front of a fixed reference mark and, on the other hand, to elaborate analog information in the form of a voltage Q indicative of the angular deviation between the heading to be followed, previously displayed by means of an index, and the heading effectively taken by the vehicle.

This display means comprises two potentiometers 91,92 continuously rotating through 360° and performing a sinusoidal function. Their sliders 91a and 92a are fast with the shaft 100 of a D.C. servo control motor 93. They are fixed at 90° with respect to each other on this shaft, so that one performs the sine $\psi'$ function whilst the other performs the cosine $\psi'$ function ($\psi'$ being the angle made by the sliders of the potentiometers with the mechanical zero reference).

The dial and the compass card, also fast with the shaft of the motor 93 rotate therewith.

The purpose of the servo-control is to effect $\psi' - \psi = 0$.

To this end, the following equation is solved:

$$R \sin (\psi' - \psi) = R \sin \psi' \cos \psi - R \sin \psi \cos \psi' = 0$$

Two amplifier-inverters 110 furnish the inverted voltages ($-R \sin \psi$) and ($-R \cos \psi$).

The first potentiometer 91, whose function is sin $\psi'$, gives at its output 91b a sinusoidal votlage indicative of R sin $\psi'$ cos $\psi'$ whilst the output 92b of the second, whose function is cos $\psi'$, delivers a sinusoidal voltage of the form R sin $\psi$ cos $\psi'$. After adjustment of the level of these two voltages by means of two impedance adapters 94 and 95, they are applied on a high gain differential amplifier 96 which effects their difference and furnishes a resultant voltage to the servo-control motor 93 whose rotation drives the dial 98 of the compass card in front of a fixed index 97 to represent the heading.

The polarity of the voltage T issuing from the amplifier 96 varies depending on whether the mechanical configuration of the assembly corresponds to $\psi' - \psi < 0$ or $\psi' - \psi > 0$, which makes the motor rotate in one direction or in the other in loop with the potentiometers, until $\psi' - \psi = 0$. At that moment, the angle represented by the compass card in front of the reference mark 97 corresponds to the angle $\psi$ of the corrected magnetic heading.

Finally, the display means may deliver a voltage proportional to the heading deviation with respect to the heading displayed by means of a knob. This knob, provided with an index, coupled by friction to the dial 98 of the compass card, makes it possible to position a slider 99 depending on the display of a heading to be followed (FIG. 7).

This slider rubs on a circular potentiometric track 98a, of which the law of variation is linear over 360° and which is subjected to a voltage Qo. The voltage issuing from the slider 99 is therefore proportional to the angle corresponding to the heading deviation.

The orthogonal axes X and Y of the magnetometer and of the inclinometer are harmonised, upon assembly, with those of the vehicle. To this end, their respective x-axes must each be merged or parallel with the longitudinal axis of the vehicle.

We have seen that the calculation of the compensation coefficients of the vehicle was effected by means of a computer 80 which may advantageously be connected to the heading system, by means of the junction box 70, only for the time necessary for the compensation procedure. This computer is mounted with its peripherals in a case and its functioning is ensured by means of the supply voltage of the vehicle, this enabling a light, manageable case to be made.

By link 70, this case measures the voltages of the sensors of the heading system. It ensures calculation of the compensation coefficients. It then introduces these compensation coefficients in the memory 2 of the electronic unit 40. It makes it possible to introduce the inclination of the earth's magnetic field of the place of compensation in the form of a voltage Uo. This information is found on a geographical map placed in the lid of the case.

The compensation procedure takes place as follows:
the vehicle is brought onto a flat, horizontal surface. This surface must be clear and free from magnetic disturbances due to the presence of metal hangars for example;

the position of possible mobile magnetic masses of the vehicle being well defined, the compensation case is connected to the heading system. The information coming from the inclinometer enables the horizontal nature of the vehicle to be controlled to within about ±0.5 degrees. Then, by means of a control knob, the operator triggers off automatic acquisition of the measurements made on the sensors, the acquisition is repeated on seven other orientations of the vehicle approximately distributed over 360°, the case automatically effects the calculations enabling the compensation coefficients to be elaborated. At the end of calculation, the case transmits to the memory of the heading system the compensation coefficients necessary for correcting the magnetic disturbances peculiar to the vehicle. An indicator light indicates that compensation is terminated and the case may be disconnected from the heading system.

Figure 10:
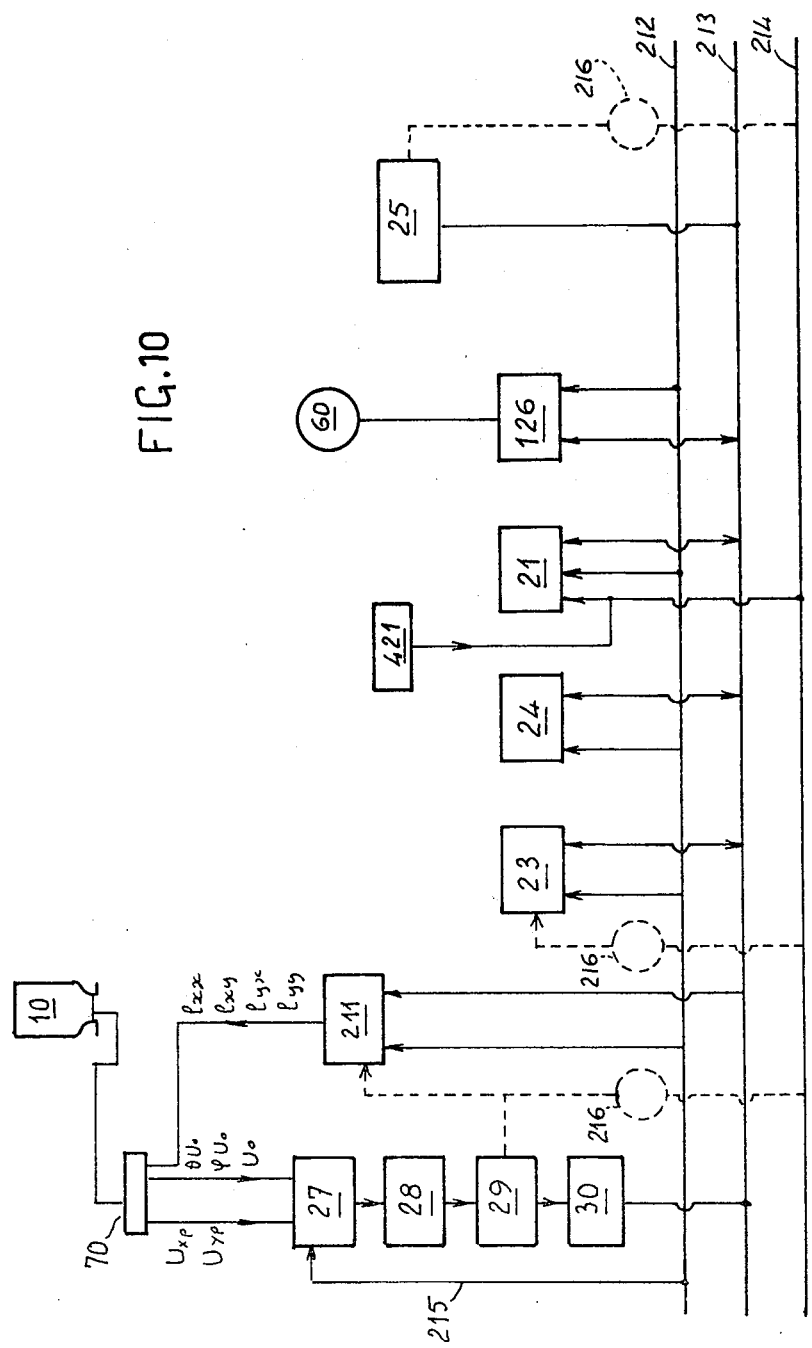
FIG. 10 shows the block diagram of the compensation case of the system of FIG. 5.

The compensation case (FIG. 10) functions as follows:

It comprises a microprocessor 21 which is synchronised on a clock 421 for execution of its program contained in a read-only memory 23.

In fact, once defined, this program consists in a series of unalterable instructions which make it possible:

to make the acquisition of the measurements Uxp, Uyp coming from the magnetometer as well as Uo, $\phi$Uo, $\theta$Uo elaborated in the heading system;

to effect the calculations of the compensation coefficients;

to introduce the compensation coefficients in the module 40 of the heading system at the end of the compensation procedure.

The development of the calculations also requires a main memory 24 intended temporarily to store the acquisitions of the measurements of the heading system, after their analog-to-digital conversion in a converter 29, as well as intermediate results in the course of functioning. The case further possesses a control module 25, at operator's disposal, which essentially comprises:

a rotary contactor or channel selector for selecting the mode of functioning, a push contactor for the control "continue", enabling the automatic acquisition calculations to leave after each change of configuration of acquisition, a potentiometer for introducing the inclination of the earth's magnetic field in the form of a voltage Uo.

The microprocessor 21 makes the selection, by an address but 212, of the instructions contained in its program memory. It reads these instructions in the read-only memory 23 via the data bus 213.

This bus enables it also to receive data coming from the heading system, namely: Uxp, Uyp, Uo, $\theta$Uo and $\phi$Uo in digital form via a multiplexer 27, a filter 28, an analog-to-digital converter 29 and a coupler 30.

Finally, the bus 213 also allows access (read-in and read-out) to the main memory 24 for the intermediate storages necessary in the course of development of the program.

"Bus" designates bundles of conductors common to a plurality of circuits.

The case also possesses a display module 60, with an interface 126 making it possible, by means for example of three lamps, to display photoengraved messages such as for example an alarm in the case of abnormality in the course of the compensation operation. The values of the angles of roll and pitch are displayed during the acquisitions on display modules of the type with 7 segments constituted for example by electroluminescent diodes.

Service modules 216, by a service bus 214, serve to validate the information for the various modules and memories. By a coupler 211, the case also emits on a digital line the service signals necessary for the inscription of correction parameters in the heading system.

The microprocessor 21 selects, by the multiplexer 27, the channel corresponding to the first parameter (for example Uxp) intervening in the calculation of the compensation.

This parameter, given in analog form, is filtered at 28, coded in digital form by the converter 29, and introduced on the data bus 213 via the coupler 30. The microprocessor 21 reads this information, records it and passes to the acquisition of the following parameter by selecting, by the address bus 212 and the selection line 215, another channel of the multiplexer 27.

Once the five parameters Uxp, Uyp, Uo, $\theta$Uo and $\phi$Uo are coded and recorded, the case requests the operator, via an indicator light, to present a new magnetic configuration and a new orientation of the vehicle to code and record the five parameters in this new configuration.

When the acquisitions have been effected in eight orientations in the various possible magnetic states of the vehicle, the microprocessor 21 effects calculation of the compensation coefficients. When calculation is terminated, the results are introduced in digital form, through a coupler 211, into the memory 2 of the compensation module 40 of the heading system.

This device for correcting the voltages furnished by a magnetometer from the coefficients elaborated by means of a computer in the course of the procedure thus described, makes it possible rapidly and effectively to compensate the magnetic disturbances resulting from the ferromagnetism influencing the environment of a magnetometer.

This device is particularly suitable for making a "heading system" which, embarked on a vehicle, elaborates at any instant the real magnetic heading of this vehicle.

Finally, it is important to emphasize that, without departing from the scope of the invention, the method of compensation set forth hereinabove may be extended to applications where a geometrical modelisation would be envisaged of the disturbed magnetometric measurements, with the aid of a model mathematically more developed than the ellipse (by taking into account in the expression of the heading error the terms $\sin 3\psi$, $\cos 3\psi$, etc.). In this hypothesis, the method of compensation would consist in identifying the parameters, characteristic of the geometric model adopted from a satisfactory number of magnetometric measurements plotted over 360°, without any heading reference, then, as before, in determining the compensation coefficients so as to be able to transform the geometrical figure representative of the model adopted into a circle centred on the origin of the reference axes.

Figure 11:
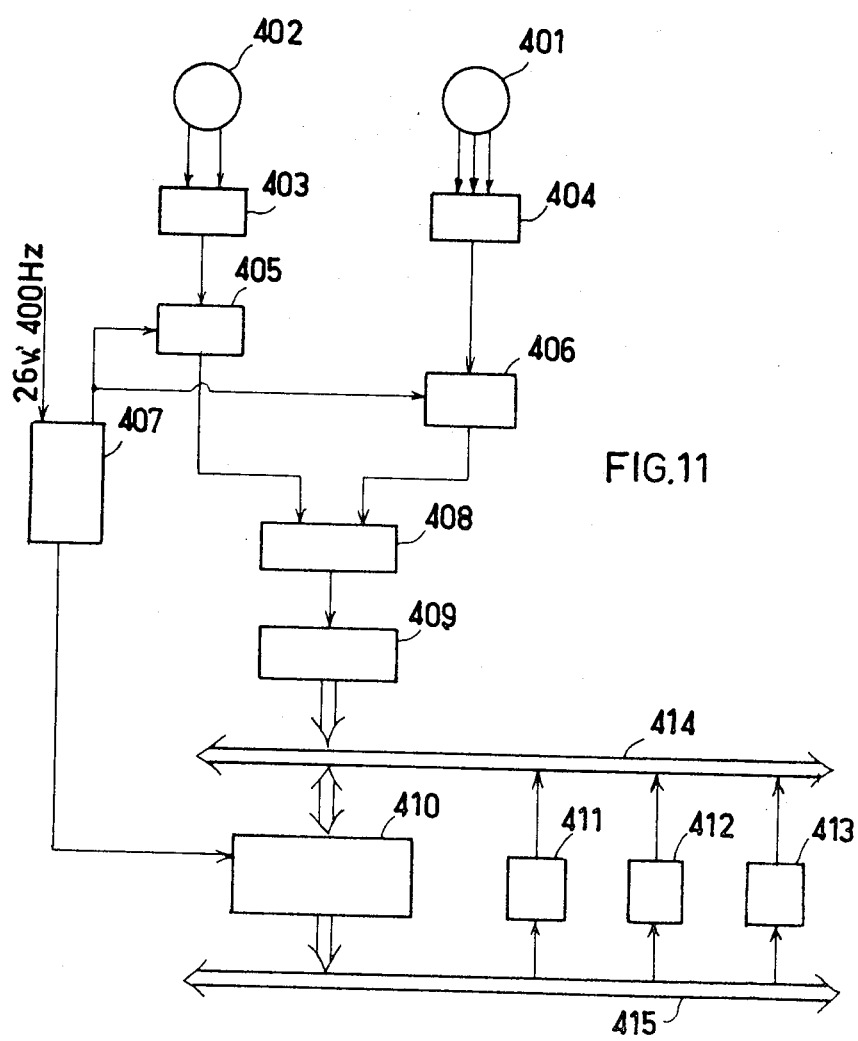
FIG. 11 shows the schematic block diagram of the heading system of an aircraft, it being recalled that FIG. 1 shows the reference axes of the vehicle of FIG. 5.

As to the heading system of an aircraft shown in FIG. 11, it comprises:

a three-axis static magnetometer 401, constituted by a non-magnetic box in which are fixed three magnetometric sensors. The sensitive axes of these sensors define a trirectangular trihedron which is harmonised, upon assembly, with the pitch attitude, roll and yaw axes of the aircraft. Ech sensor functions according to the known principle consisting in subjecting a bar of high magnetic permeability to hysteresis cycles due to an A.C. signal.

The outer magnetic field provokes a dissymmetry of the hysteresis cycle which is detected and cancelled due to an opposite field created by a current circulating in a coil. From this current, a voltage is elaborated which is proportional to the outer field thus measured.

a vertical gyroscope 402 or an inertial navigation unit which delivers either analog voltages indicative of the roll $\psi$ and of the pitch attitude $\theta$ of the aircraft, or digital signals.

a computing unit 410 which effects, in real time, the calculations of the compensation coefficients and of the real magnetic heading.

This computing unit may for example be an 8-bit microprocessor MC 6800 of N-MOS technology, used in mixed fashion, either for calculations in 16 bits with fixed point, or for calculations in 24 bits with floating point.

This computing unit 410 also possesses memories connected to a data base 414 and an address bus 415, viz.

a program memory 411 (REPROM of N-MOS technology) of 8K octets, for example, a first main memory 412, of 512 octets (RAM type of C-MOS technology) and a second main memory 413 of 1K bits serving to retain the data to safeguard the results of autocompensation from one flight to another when the electrical supply of the aircraft is cut off. This memory is constituted by a RAM memory of C-MOS technology.

Input/output interfaces enable the incoming data to be acquired and digitally coded. These are:

multiplexers 403 and 404 a peak sampler 405 for the gyroscope 402, a sample and hold 406 for successively taking the three voltages issuing from the magnetometer 401.

The samplers are controlled by a chronometer 407 to furnish the control pulses.

The input signals thus picked up are then directed towards a multiplexer 408 and introduced into an analog-to-digital converter 409 before being able to be used in the computing unit 410 which elaborates, in digital form, the various data necessary for navigation, namely: the pitch attitude, the roll and the autocompensated magnetic heading.

In practice, it will be advantageous, to make the device for compensating the magnetic disturbances, to arrange for the axes of the gyroscope and of the magnetometer to be harmonised with those of the aircraft.

The compensation coefficients may be calculated in real time if the computer is on board, or on the ground, after memorisation of the information taken during flight.

What we claim is:

1. A device for compensating the magnetic disturbances influencing the measurements of a device which determines a magnetic heading on board a land vehicle comprising a magnetometer for furnishing analog voltages proportional to the components of the disturbed magnetic field of the earth, along reference axes of the magnetometer, a memory of a computer module associated with the magnetometer for receiving so-called compensation coefficients, which make it possible to correct the information delivered by the magnetometer to obtain the real heading, wherein the device further comprises:

means for identifying a closed plane geometrical figure described by an end of a first vector Hhp indicative of the disturbed magnetic field when the vehicle rotates on itself through 360° on a horizontal plane;

means for transforming this closed geometrical figure into a circle of any radius centered on the origin of the reference axes of the magnetometer and representing the locus of an end of a second vector Hh representative of the non-disturbed magnetic field, and means for calculating the coefficients serving to define the correspondence between all the points of said closed geometrical figure and their homologues on said circle.

2. The device according to claim 1 wherein said closed geometrical figure is an ellipse.

3. The device according to claim 1 further comprising an inclinometer associated with the magnetometer for checking that the vehicle is on a horizontal plane during the compensation procedure, and a memory of the heading determining device for receiving the compensation coefficients necessary for elaborating two voltages indicative of the components Hx an Hy, respectively, of the non-disturbed magnetic field of the earth.

4. The device according to claim 3 further comprising: means for delivering in analog form the information comprising disturbed voltages furnished by the magnetometer, a constant voltage indicative of the vertical component of the earth's magnetic field and voltages indicative of the slope of the vehicle furnished by the inclinometer; means for multiplexing said information; means for filtering said information, means for digitally coding said information; means for introducing said information on a data bus of a computer which elaborates the compensation coefficients; and a memory of a computer module of the heading determining device to which said compensation coefficients are transmitted.

5. A device for compensating the magnetic disturbances influencing the measurements of a device which determines a magnetic heading on board an aircraft comprising a magnetometer for furnishing analog voltages proportional to the components of the disturbed magnetic field of the earth along reference axes of the magnetometer, a memory of a computer module associated with the magnetometer for receiving so-called compensation coefficients which make it possible to correct the information delivered by the magnetometer to obtain the real heading, and further comprising:

means for examining the evolution of the module of the disturbed magnetic field of the earth in space, assuming that the module of the earth's field is constant between two successive measurements, means for computing in iterative manner the compensation coefficients enabling the evolution of the module of the earth's magnetic field to be returned from an ellipsoid to a theoretical sphere centered on the axes of the magnetometer, in order to define the correspondence between the disturbed measurements and the real measurements.

6. A device according to claim 5, further comprising means for digitally coding three analog voltages measured by the magnetometer and indicative of the components of the magnetic field along three respective axes of the magnetometer, and a data bus of a computer on which said voltages are introduced and which elaborates the compensation coefficients in real time.

7. A device according to claim 6 wherein the computer is arranged for calculating the real magnetic heading from the complementary roll and pitch attitude data furnished by a vertical gyroscope or an inertial measuring unit.

8. The device according to claim 7 wherein the display means comprise two potentiometers rotating through 360° of which the sliders are offset by 90° and are fast with the shaft of a servo-control motor also connected to the compass card, and an ampli-differential receiving the voltages furnished by the potentiometers and connected by its output to the servo-control motor.

9. A device for determining a magnetic heading of which the measurements are compensated by the device according to one of claims 4 or 5, wherein said device comprises:

a magnetometer delivering analog voltages proportional to respective components of the disturbed magnetic field Hp of the earth along axes of the magnetometer;

a power supply;

a computer module which, from the measurements made by the magnetometer and from compensation coefficients previously stored in a memory elaborates the real heading, characterized in that the device further comprises:

means for obtaining three electrical magnitudes proportional to the components of the earth's magnetic field along three respective axes;

means for furnishing a vertical reference in the form of electrical magnitudes indicative of the roll and the pitch attitudes, respectively, of the carrier; and means for effecting calculations of the compensation coefficients and of the real magnetic heading from the magnitudes furnished by the said other means.

10. The device according to claim 9 wherein the means for obtaining the magnitudes proportional to the components of the earth's magnetic field comprise the magnetometer; and the means for furnishing a vertical reference comprise a vertical gyroscope or an inertial measuring unit.

11. The device according to claim 10 wherein the magnetometer is a three-axis static magnetometer delivering three analog voltages proportional to respective components of the disturbed magnetic field of the earth along respective axes of the magnetometer;

the vertical gyroscope delivers respective signals indicative of the roll and the pitch attitude of the vehicle, and the following are provided:

two multiplexers;

a first peak sampler;

a second sample and hold;

a chronometer generating control pulses;

a third multiplexer for introducing the analog information into an analog-to-digital converter;

a computer unit with memories and data and address buses, for elaborating the compensation coefficients necessary for determining the components of the non-disturbed magnetic field and for deducing the real magnetic heading therefrom.

12. The device according to claim 10 wherein the axes of the magnetometer and of the gyroscope are harmonised with those of the aircraft.

13. A device for determining a magnetic heading of which the measurements are compensated by the device according to one of claims 3 or 4 wherein it comprises:

a magnetometer for delivering analog voltages proportional to respective components of the disturbed magnetic field of the earth along axes of the magnetometer;

a power supply;

a computer module which, from the measurements made by the magnetometer and from compensation coefficients previously stored in a memory elaborates the real heading, characterized in that it further comprises:

an inclinometer comprising sensors sensitive to the slope of the vehicle along the same axes as those of the magnetometer, and delivering corresponding voltages;

wherein the computer module elaborating voltages correspond to the components of the non-disturbed magnetic field of the earth along the axes of the magnetometer and of the inclinometer, taking into account the influence of the angles of roll and of pitch of the vehicle.

14. The device according to claim 13 wherein the axes of the magnetometer and of the inclinometer are harmonised with those of the carrier vehicle.

15. The device according to claim 14 wherein the voltages corresponding to the components of the non-disturbed magnetic field of the earth are exploited by display means comprising a compass card rotating in front of a fixed reference mark and furnishing the magnetic heading of the vehicle.

* * * * *